United States Patent [19]

Bielkevicius et al.

[11] Patent Number: 4,554,541

[45] Date of Patent: Nov. 19, 1985

[54] FLAG DETECTION CIRCUIT

[75] Inventors: Jonas R. Bielkevicius, Newton; Paul M. Schmitt, Needham, both of Mass.

[73] Assignee: GTE Communications Products Corporation, Stamford, Conn.

[21] Appl. No.: 531,516

[22] Filed: Sep. 12, 1983

[51] Int. Cl.[4] .......................................... H04Q 00/00
[52] U.S. Cl. .............................. 340/825.68; 328/119; 377/75
[58] Field of Search .................... 370/60, 58, 94, 100; 377/76, 75; 307/234, 518; 328/105, 119, 153; 340/354, 356, 825.62, 825.68, 870.13; 364/200, 900; 375/8, 114, 117

[56] References Cited

U.S. PATENT DOCUMENTS

| 3,151,314 | 9/1964 | Root et al. ........................ 377/75 X |
| 4,284,953 | 8/1981 | Hepworth et al. .................... 377/75 |
| 4,491,945 | 1/1985 | Turner ............................. 370/94 X |

Primary Examiner—Ulysses Weldon
Attorney, Agent, or Firm—J. Stephen Yeo

[57] ABSTRACT

A logic circuit detects an eight bit flag, "01111110," which according to an accepted telecommunication protocol begins and ends each packet of serially sent digitized voice or data. The circuit may easily be added to existing hardware.

4 Claims, 1 Drawing Figure

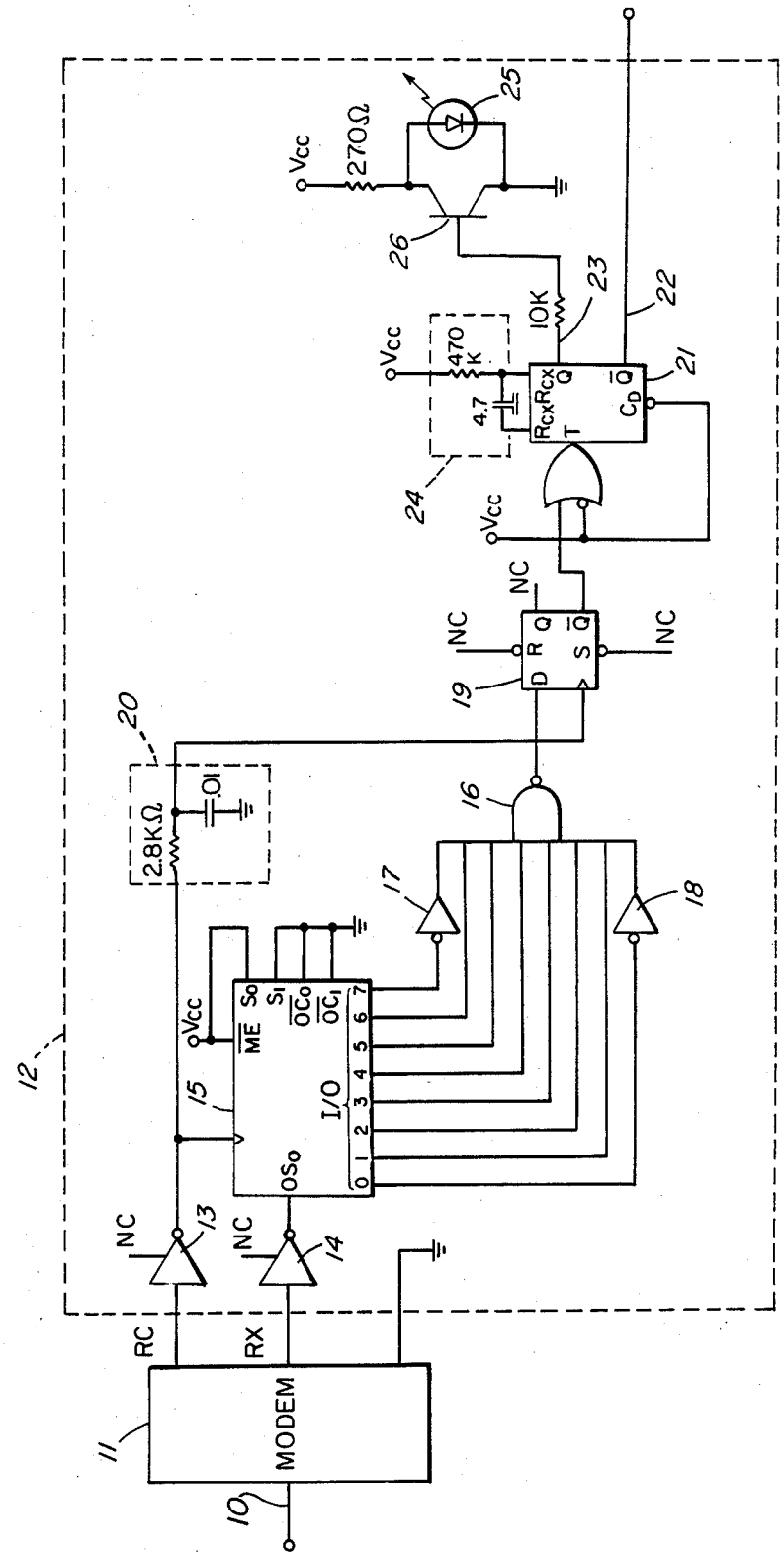

FLAG DETECTION CIRCUIT

BACKGROUND OF THE INVENTION

The invention pertains to telecommunications and, more particularly, with the detection of flags used to identify packets of information sent on telecommunication channels.

Packet transmission is a technique used to efficiently send digitized data and voice through telecommunication channels. Under standards adopted in Europe and the United States (e.g., X.25) each packet starts and ends with the eight bit flag "01111110." If a channel is idel, flags are sent each 0.45 second. If a channel is disabled, all "1's" will be received.

It is known to monitor a channel for flags so that appropriate measures may be taken if a channel becomes disabled. For example, the Intel Corporation's Model 8273 programmable HDLC/SDLC protocol integrated circuit may be used for this purpose.

The use of specialized integrated circuits requires a relatively large hardware and software effort. The Intel 8273 integrated circuit is, for example, intended for use with Intel's 8080 or 8085 microprocessor so hardware deviations require substantial design effort.

It is desirable to provide a circuit which is compatible with existing systems without extensive additional hardware or software changes.

BRIEF DESCRIPTION OF THE DRAWING

The single FIGURE is a schematic representation of a flag detector circuit embodying the invention.

For a better understanding of the present invention, together with other and further objects, advantages and capabilities thereof, reference is made to the following disclosure and appended claims in connection with the above-described drawing.

DESCRIPTION OF THE INVENTION

Referring to the drawing, a communication channel 10 carries digitized packet messages encoded in FSK tones. A modem 11 is used to demodulate the FSK tones into binary code. The modem 11 provides an RS232 standard serial digital data signal stream RX and a synchronized clock pulse RC to flag detection circuit 12. For a digital channel modem 11 is not necesary, and other means to provide a clock pulse synchronized with the stream may be used. In a 4800 baud rate system the time between clock pulses is about 208 microseconds.

The flag detection circuit 12 includes receivers 13, 14 to buffer incoming RX and RC logic levels.

An octal shift register 15 converts the serial data RX into parallel data. Shift register 15 is gated by the clock RC. Upon each clock pulse, bits within the register are shifted one step and the next serial bit is accepted by the register 15. Between clock pulses the eight most recent consecutive bits are stored in the shift register 15 and are read out in paralel. The eight bit parallel output of the shift register 15 is coupled to an eight bit input NAND gate 16. Inverters 17, 18 (i.e., NOT gates) are provided in series with the most significant bit and the least significant bit input of the NAND gate. In this way, if the shift register 15 contains the flag code "01111110" then the input to NAND gate 16 is "11111111." NAND gate 16 only provides a logic "0" output while it receives a "11111111" input.

The output of NAND gate is coupled to the input of gated latch 19. Gated latch 19 is used to synchronize flag detection with clock pulses delayed by RC delay circuit 20. A seventeen microsecond delay is desirable because shift register 15 may give an erroneous output during transient shifting.

In response to a logic "0" from NAND gate 16 and a delayed clock pulse, the output of latched gate 19 is a logic "1" flag detection pulse having a duration equal to the 208 microseconds between clock pulses. The output of latched gate 19 is coupled to trigger one shot circuit 21 with a logic "1". One shot circuit 21 has complementary outputs $\overline{Q}$, 22 and Q, 23.

RC circuit 24 sets the time period of one shot circuit 21 to about one second. If a logic "1" is not received with a time period then a logic "1" is provided at output 22, and a logic "0" appears at output 23, indicating a loss of flag condition.

As defined by X.25 protocol a message can be a maximum of 268 bytes long (2144 bits). This figure includes two eight bit flags appended to each end of the message. Using a transmission rate of 4800 baud it takes about 0.45 seconds to transmit 2144 bits. This translates to a worst case of two flags every half second.

Flags should be detected at a minimum rate greater than 0.45 seconds to determine a loss of flag condition. To avoid "false alarms" and to allow for a margin of safety the minimum is approximately doubled to one second. Thus, if a minimum of one flag per second is detected a logic "0" is maintained at output 22. If there is a flag fault (no flags for one second or more) a logic "1" is provided at output 22 to indicate the fault. Upon receipt of a flag a logic "0" appears at output 22.

A visual flag indicator may also be provided. An LED 25 is arranged in parallel with transistor 26. A logic "0" from output 23 turns off transistor 26 allowing current to flow through LED 25.

Commercially available TTL integrated circuits, such as listed in Table 1, may be used to build the flag detection circuit.

TABLE 1

| | |
|---|---|
| Receivers 13, 14 | MC1489 |
| Shift Register 15 | 74LS299 |
| Inverters 17, 18 | 74LS04 |
| NAND Gate 16 | 74LS30 |
| Latch Gate 19 | 74LS74 |
| One Shot 21 | 96LS02 |

While there has been shown and described what is at present considered the preferred embodiment of the invention, it will be obvious to those skilled in the art that various changes and modifications may be made therein without departing from the scope of the invention as defined by the appended claims.

We claim:

1. A flag detection circuit for detecting the binary flag "01111110" serially transmitted through a telecommunication channel, comprising:
   receiving means for receiving serial digital bits from said telecommunication channel;
   clock means for providing clock pulses synchronized with said digital signals;
   an octal shift register arranged with said receiver means and said clock means for storing the eight most recent consecutive bits from said telecommunication channel and having an eight bit output at which the eight stored bits appear in parallel;
   a NAND gate having an eight bit input coupled to the eight bit output of said octal shift register and having an output; said eight bit input has a most significant bit input and a least significant bit input;

a first inverter interposed in the most signifcant bit input of said NAND gate; and a second inverter interposed in the least significant bit input of said NAND gate;

said NAND gate arranged to provide a logic "0" output upon the presence of all "1" inputs.

a latched gate having an input coupled to the output of said NAND gate; and a delay circuit interposed between said clock means and said latched gate for delaying said clock pulses;

said latched gate having an output arranged to provide a logic "1" at said output of said latched gate upon the presence of a logic "0" input and a delayed clock pulse, said logic "1" indicative of a detected flag.

2. The flag detector circuit of claim 1 which further includes:

a one shot circuit having an input coupled to the output of said latched gate and arranged to be triggered by a logic "1" from said latched gate and for giving at a first output a logic "0" for a time period after being triggered.

3. The flag detector circuit of claim 2 wherein said time period is approximately one second.

4. The flag detector circuit of claim 2 wherein said one shot circuit provides a second output complementary to the first; and which further includes indicating means arranged to be responsive to the second output of the one shot circuit for indicating the detection of flags.

* * * * *